April 9, 1935. O. N. GREDELL 1,996,918
AUTOMATIC CLUTCH CONTROL MECHANISM
Filed March 21, 1932 2 Sheets-Sheet 1

INVENTOR.
Otto N. Gredell
BY Arthur E. Brown
ATTORNEY.

April 9, 1935.  O. N. GREDELL  1,996,918
AUTOMATIC CLUTCH CONTROL MECHANISM
Filed March 21, 1932  2 Sheets-Sheet 2
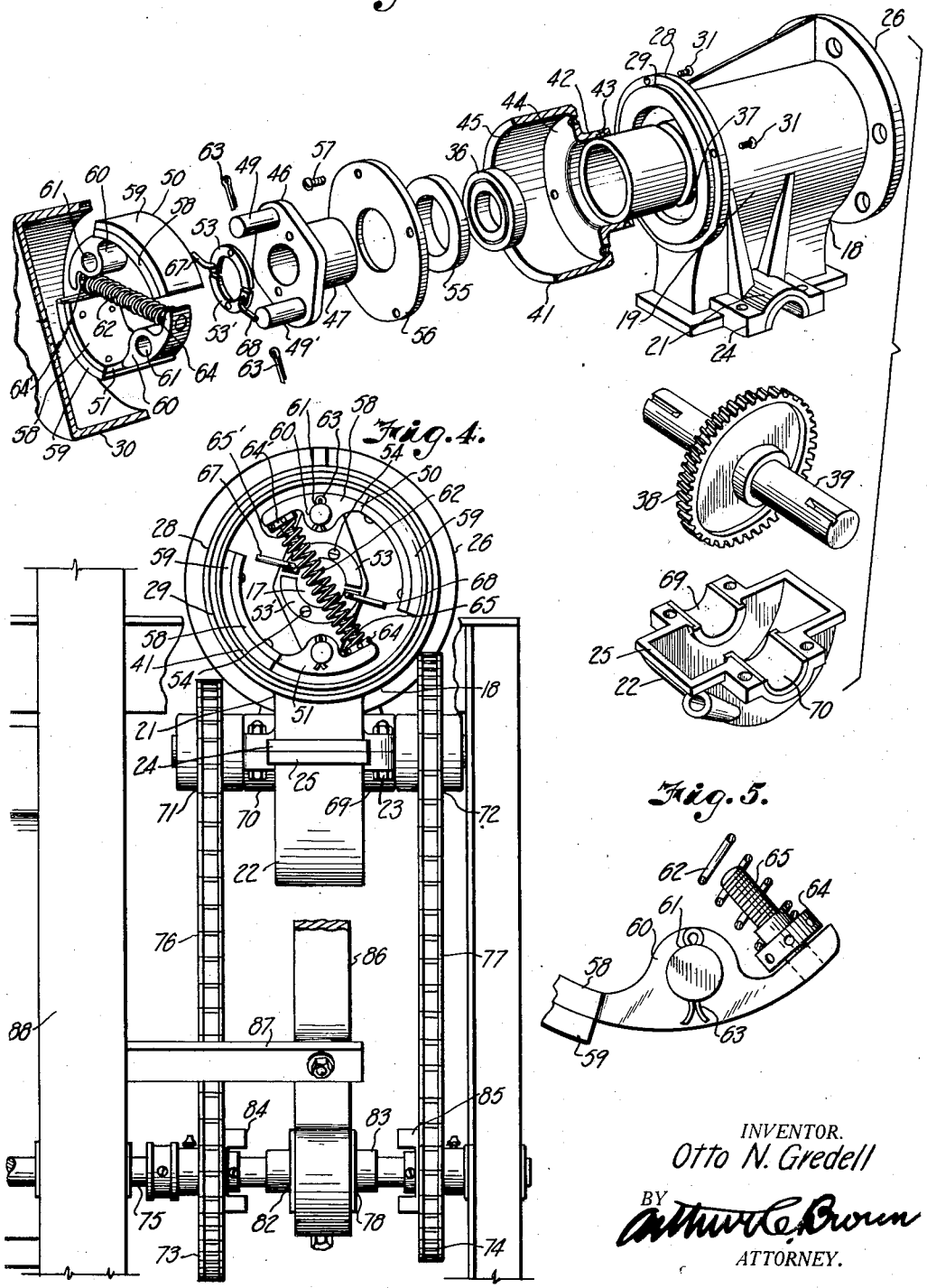
INVENTOR.
Otto N. Gredell
BY Arthur C. Brown
ATTORNEY.

UNITED STATES PATENT OFFICE 1,996,918

AUTOMATIC CLUTCH CONTROL MECHANISM

Otto N. Gredell, Kansas City, Mo., assignor to Standard Steel Works, North Kansas City, Mo., a corporation of Missouri Application March 21, 1932, Serial No. 600,238

5 Claims. (Cl. 192—105)

This invention relates to automatic clutches and more particularly to one of that character for controlling operation of a conveyor delivering material to a grinding mill, and has for its principal object to effect automatic operation of the conveyor proportionate to the rate of reduction in the grinding mill.

Other important objects of the invention are to provide a simple, positively operating control clutch mechanism for operably connecting the power shaft of the grinder with the gearing mechanism driving the conveyor, to provide a device which is readily adjusted to effect operation of the conveyor at desired rotational speeds of the grinder, and to provide means for rendering the automatic release of the clutch ineffective, whereby the conveyor may be constantly driven regardless of speed of rotation of the rotor.

In accomplishing these and other objects of the invention, I have provided improved details of structure, the preferred form of which is illustrated in the accompanying drawings, wherein:—

Fig. 3 is a disassembled perspective view of the parts of the clutch mechanism shown in spaced relation, the clutch drum and housing therefor being shown in section.

Fig. 4 is a detail end elevational view of the control clutch mechanism and driving connections between the driven shaft of the transmission and the countershaft of the conveyor, whereby two different selective speeds are provided for the conveyor.

Fig. 5 is an enlarged detail fragmentary view of a portion of one of the clutch shoes illustrating the adjustment whereby clutching engagement of the shoes is regulated to provide operation of the conveyor at certain selected rotational speeds of the grinder rotor.

Figure 1:
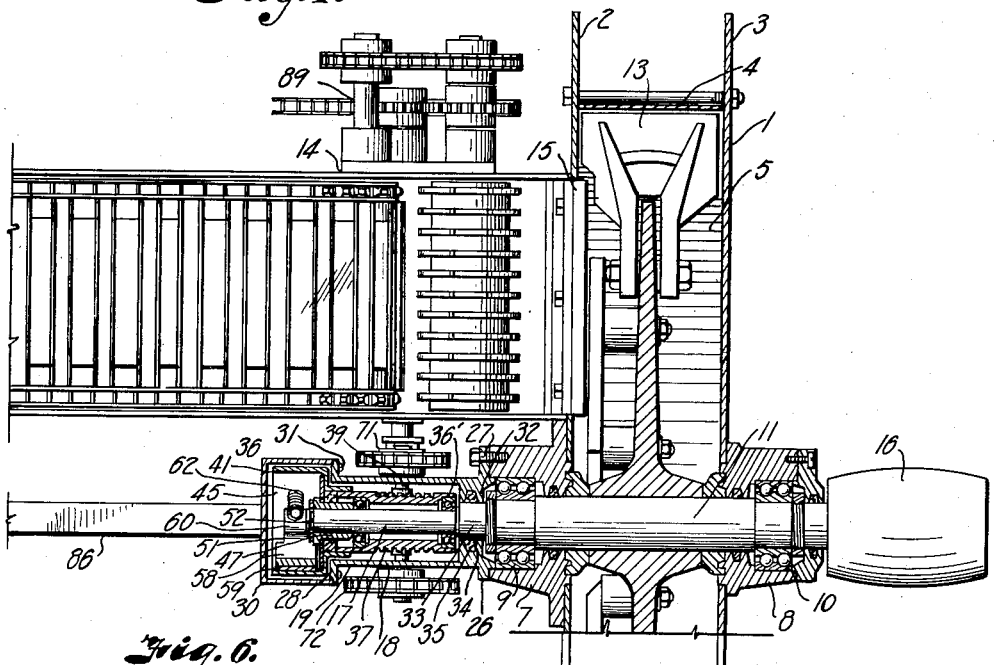
Fig. 1 is a horizontal sectional view through a grinding mill employing a conveyor for feeding material into the reduction chamber thereof and equipped with a conveyor control mechanism constructed in accordance with my invention.
Figure 6:
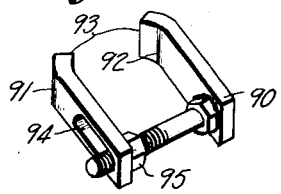
Fig. 6 is a detail perspective view of the clamp for locking the clutch shoes in engagement with the clutch drum, whereby the conveyor is driven regardless of the speed of the rotor.

Referring more in detail to the drawings:—

1 designates a grinder housing including side plates 2 and 3 spaced apart by a substantially circular band 4 to form a cylindrical rotor chamber 5 therebetween. The band includes a screen portion 6 located at the upper periphery of the reduction chamber and through which reduced material is discharged from the housing.

The side plates 2 and 3 are provided with bearing brackets 7 and 8 carrying anti-friction bearings 9 and 10, respectively, for mounting the ends of a rotor shaft 11.

Fixed to the rotor shaft 11 and operable within the reduction chamber is a rotor 12 including radially extending hammers 13 for cooperating with the inner face of the band 4 and the screen 6 to effect reduction of the material delivered to the housing by a conveyor generally designated 14, which discharges through an inlet opening 15 in the side plate 2, as illustrated in Fig. 1.

The rotor shaft is driven by a suitable pulley 16 fixed to a projecting end thereof adjacent the bearing bracket 8, as in ordinary grinder construction. The opposite end of the rotor shaft is provided with a reduced extension 17 projecting into a gear housing 18 now described.

The gear housing 18 includes a cylindrical sleeve-like portion 19 extending axially of the shaft to house a worm gear and a lower substantially semi-cylindrical portion 21 forming the upper part of the worm gear housing, which includes a semi-circular cap portion 22 secured to the portion 21 by bolts 23 extending through mating flanges 24 and 25 on the portion 21 and cap 22, respectively.

The portion of the gear housing 19 is provided on the end adjacent the bearing bracket 7 with a peripheral flange 26 engaging against the end of the bracket and which is secured thereto by bolts 27 extending through openings in the flange and threaded sockets formed in the face of the bracket 7. The opposite end of the gear housing is provided with an annular flange 28 having an annular shoulder 29 to seat a cover member 30 for enclosing the clutch mechanism later described. The cover member 30 is secured to its seat on the flange 28 by screws 31 extending through openings in the flange and into threaded sockets formed in the cover member, as best illustrated in Fig. 3.

The end of the cylindrical portion 19 of the gear housing adjacent the bearing bracket 7 is provided with an annular inwardly extending flange 32 encircling an intermediate stepped portion 33 of the rotor shaft and which is provided with an internal annular groove 34 for accommodating a packing ring 35 to prevent leakage of lubricant from the gear housing toward the interior of the reduction chamber.

Mounted in spaced relation on the shaft extension 17 are anti-friction bearings 36 and 36' for rotatably mounting a worm 37 meshing with the worm gear 38 carried on a driven shaft 39 mounted in the lower portion of the housing. The worm 37 includes a sleeve-like body portion of substantially larger diameter than the shaft extension and is provided at its opposite ends with annular recesses to accommodate the outer bearing races for the anti-friction bearings 36 and 36', respectively.

Figure 2:
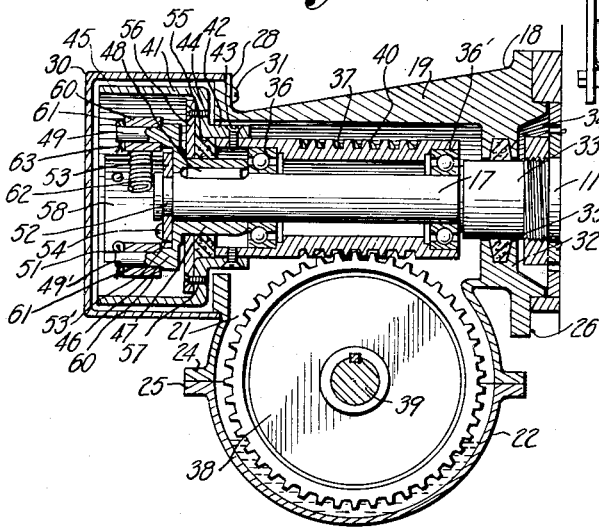
Fig. 2 is a detail vertical sectional view through the control clutch mechanism and the driving gears for operating the conveyor from the rotor shaft of the grinder.

Formed on the outer periphery of the body portion intermediate the bearings 36 and 36' is a spiral thread 40 for engaging the teeth on the worm gear 38. The outer end of the worm extends beyond the bearing 36 and mounts a clutch drum 41. The clutch drum 41 includes a hub portion 42 having an inner diameter to snugly engage the periphery of the worm and which is secured thereto by screws 43 extending through openings in the hub and into threaded openings formed in the extension of the worm, as best illustrated in Fig. 2. Extending radially of the hub portion is a disk portion 44 terminating in an annular laterally extending flange 45 forming an annular clutch engaging face for the clutch shoes later described.

Keyed to the end of the shaft extension 17 adjacent the bearing 36 is a clutch shoe carrying member 46 having a hub portion 47 engaging against the bearing 36 to retain the worm in position on the shaft extension and the bearing 36' against the shoulder formed by the stepped portion of the shaft. The member 46 is secured to the shaft by a spline 48, as best illustrated in Fig. 2, whereby the shoe carrier is positively driven upon rotation of the shaft. Extending laterally from the outer face of the member 46 and spaced radially from the axis thereof are pins 49—49' for mounting the clutch shoes 50 and 51, respectively.

In order to lock the member 46 against longitudinal movement on the shaft, the end of the shaft is provided with an annular groove 52 for accommodating segmental lock rings 53—53'. The segments are substantially semi-circular and have a suitable inner diameter to engage in the groove 52 and whereby the segments overlap the forward face of the shoe carrier. The segments are secured to the shoe carrier by screws 54 extending through openings in the segments and into threaded sockets formed in the face of the carrier.

To prevent leakage of lubricant from the interior of the worm, a gasket ring 55 is sleeved over the hub of the carrier member and is compressed into sealing engagement therewith and against the end of the worm by a ring 56 engaging against the disk portion of the clutch drum and which is secured thereto by screws 57.

The shoes 50 and 51 include arcuate-shaped arm portions 58 provided with fabric linings 59 adapted to engage the inner periphery of the clutch drum 41. Depending from the inner face of the arms 58 at their ends opposite to the linings 59 are ears 60 having openings 61 for engaging the pins 49—49', whereby the shoes are pivotally mounted on the carrier and adapted to move into engagement with the clutch drum under control of a regulating spring 62. The shoes are retained on the pins by cotter pins 63, as shown in Fig. 5.

The spring 62 extends diametrically across the clutch drum and has opposite ends engaging against nuts 64—64' carried on threaded studs 65—65' extending inwardly from the ends of the arms opposite to the brake linings 59. The spring thus tends to retain the lining portion of the shoes out of engagement with the clutch drum, but is adapted to yield due to centrifugal force created by the revolving shoes when the rotor shaft has attained a certain R. P. M., to permit the shoes to engage the clutch drum, thereby operably connecting the worm with the shaft. The time at which the clutch shoes engage the clutch drum may be controlled by adjusting tension of the spring 62 upon threading the nuts inwardly toward the axis of the shaft.

In order to limit retractive movement of the shoes the ring segments 53—53' are provided at opposite diametrical points with stop members 67 and 68 extending radially and in the path of the shoes, as best illustrated in Fig. 4.

The shaft 39 is rotatably mounted in bearings 69 and 70 and its end projects outwardly therefrom to mount sprockets 71 and 72. Running over the sprockets 71 and 72 and over aligning sprockets 73 and 74 on a countershaft 75 are chains 76 and 77, respectively. The sprockets 71 and 73 and the sprockets 72 and 74 are of differential diameter whereby the countershaft may be rotated at different speeds depending upon which of the sprockets 73 or 74 is engaged with the countershaft, as now described.

Splined on the countershaft between the sprockets 73 and 74 is a clutch collar 78 having oppositely facing clutch teeth 82 and 83 for engaging complementary teeth 84 and 85 on the respective gears. The clutch collar is actuated by a lever arm 86 pivotally mounted on a bracket 87 extending from the conveyor frame 88, as best illustrated in Fig. 4.

It is thus apparent that when the teeth 82 of the clutch collar are engaged with the teeth on the sprocket 73, the countershaft is operable by the chain 76 upon rotation of the worm 37, and when the clutch teeth 83 are engaged with the teeth 85, the countershaft is operable by the chain 77, whereby two different speeds may be imparted to the countershaft.

The conveyor 14 is operable from the countershaft through suitable gearing indicated at 89, but which forms no part of the present invention.

Figure 7:
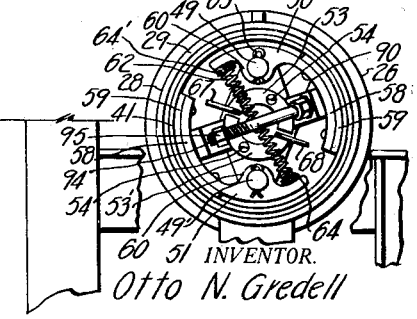
Fig. 7 is an end elevational view of the clutch mechanism showing the clamp in position for locking the shoes in engagement with the drum.

In order that the clutch shoes may be positively retained in engagement with the clutch drum, I provide a clamp member 90. The clamp member 90 includes spaced jaws 91 and 92 having curved ends 93 for engaging against a periphery of the segments 53 and 53', while the outer ends of the jaws lie flat against the arcuate-shaped arms, as illustrated in Fig. 7.

The jaws are retained in engagement with the shoes by a bolt having its head welded to the outer end of one of the jaws and its shank extending through a slot 94 in the other jaw. A nut 95 is threaded onto the bolt for engaging the inner face of the slotted jaw to spread the jaws apart to prevent operation of the shoes and retain them in wedging engagement with the clutch drum.

Assuming that the clutch mechanism is constructed and assembled as described, the pulley is belted to a suitable prime mover to actuate the rotor shaft. When the rotor attains its proper speed the shoes engage the clutch drum. Upon engagement of the shoes, the clutch drum is rotated therewith to rotate the worm 37. Rotation of the worm rotates the worm gear to drive the driven shaft 39. Rotation of the driven shaft drives the sprockets 73 and 74 through the chains 76 and 77. The time at which the shoes engage the clutch drum is governed by adjusting tension of the spring 62 upon regulation of the nuts 64 and 64'.

If a high conveyor speed is desired, the clutch collar is shifted by the lever 86 to the right (Fig. 4), so that the teeth 83 engage the teeth 85 on the sprocket 74. If a lower speed is desired, the collar is shifted in the opposite direction to engage the teeth 82 with the teeth of the sprocket 73.

Should a greater quantity of material be fed in the reduction chamber than can be handled by the rotor, the material retards rotation of the rotor to slow down the power shaft 11, which permits the spring 62 to move the shoes away from the clutch drum, stopping feed of the conveyor. As soon as the rotor attains its original speed, centrifugal force acting on the shoes overcomes the tension of the spring 62 to permit the shoes to engage the clutch drum to drive the conveyor.

When the grinder is operating to cut ensilage, the shoes 50 and 51 may be retained in driving relation with the clutch drum by applying the clamping member 90.

From the foregoing, it is apparent that I have provided a clutch control mechanism which is simple in construction and well adapted for the purpose for which it is employed.

What I claim and desire to secure by Letters Patent is:

1. In an apparatus of the character described, a driving shaft, a member loosely mounted on the driving shaft, a clutch drum fixed to said member and having an internal clutch engaging face concentric with the driving shaft, a clutch shoe carrying member fixed to the driving shaft, clutch shoes, means for pivotally mounting the clutch shoes on said carrying member for movement in the direction of rotation of the driving shaft to engage the clutch face of said drum responsive to centrifugal force generated by gyration of the clutch shoes, and yielding means normally retaining said clutch shoes from engagement with the clutch face until the driving shaft has attained a predetermined speed, said clutch shoes and shoe carrying member being provided with surfaces adapted to cooperate with insertable jaw members to retain the clutch shoes in engagement with the clutch engaging face to render said yielding means ineffective.

2. In an apparatus of the character described, a housing, a driving shaft rotatably mounted in the housing and having a stop shoulder, a driven member in the housing having bearing recesses in the ends thereof, anti-friction bearings in said recesses for mounting the driven member on the driving shaft, a clutch shoe carrying member fixed to the driving shaft at a point spaced from said stop shoulder and having a hub portion engaging against one of the bearings to retain the other bearing against said stop shoulder, a clutch drum fixed to the driven member, clutch shoes on the shoe carrier and engageable with the clutch drum, and a packing element sealingly engaging the carrier for retaining lubricant in the bearings from travelling to the clutch shoes and clutch drum.

3. In an apparatus of the character described, a housing, a driving shaft rotatably mounted in the housing having a stop shoulder, a driven member in the housing having bearing recesses in the ends thereof, anti-friction bearings in the recesses for mounting the driven member on the driving shaft, a clutch shoe carrying member fixed to the driving shaft at a point spaced from said stop shoulder and having a hub portion engaging against one of the bearings to retain the other bearing against said stop shoulder, a clutch drum fixed to the driven member, clutch shoes on the shoe carrier engaging the clutch drum, a packing ring sealingly engaging the carrier and seating against the driven member to prevent lubricant in the bearings from travelling to the clutch shoes, a retaining ring sleeved over said hub portion and engaging the packing ring, and means for securing the retaining ring to the clutch drum.

4. In an apparatus of the character described, a housing, a driving shaft rotatably mounted in the housing and having a stop shoulder, a driven member in the housing having a sleeve portion spaced from the driving shaft, anti-friction bearings for rotatably mounting the driven member on the shaft, a clutch drum having a hub portion sleeved over the sleeve portion of the driven member, means for securing the hub portion of the clutch drum to the sleeve portion of the driven member, a clutch shoe carrier fixed to the shaft and having a hub portion sleeved in the sleeve portion of the driven member and engaging one of the bearings to retain the other bearing against said stop shoulder, clutch shoes on the carrier, and sealing means sealingly engaging said hub portions on the clutch shoe carrying member and on the drum to retain lubricant in the bearings.

5. In an apparatus of the character described, a driving shaft, a member loosely mounted on the driving shaft, a clutch drum connected with said member and having an internal clutch engaging face concentric with the driving shaft, a clutch shoe carrying member fixed to the driving shaft and having jaw engaging portions, clutch shoes having jaw engaging portions, means for pivotally mounting the clutch shoes on said carrying member to engage the clutch face of said drum responsive to centrifugal force generated by gyration of the clutch shoes, yielding means normally restraining said clutch shoes from engagement with the clutch face, and wedge means having jaw portions to engage with said jaw engaging portions for retaining the clutch shoes in engagement with the clutch engaging face in opposition to said yielding means.

OTTO N. GREDELL.